(12) United States Patent
Asada et al.

US009339949B2

(10) Patent No.: US 9,339,949 B2
(45) Date of Patent: May 17, 2016

(54) DIE FOR FORMING MOLDING AND METHOD FOR PRODUCING DECORATIVE MOLDING-FURNISHED GLASS USING THE DIE

(75) Inventors: Takahiro Asada, Matsusaka (JP); Mitsuhiro Takayama, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 296 days.

(21) Appl. No.: 13/810,613

(22) PCT Filed: Jul. 12, 2011

(86) PCT No.: PCT/JP2011/065862
§ 371 (c)(1),
(2), (4) Date: Jan. 16, 2013

(87) PCT Pub. No.: WO2012/011409
PCT Pub. Date: Jan. 26, 2012

(65) Prior Publication Data
US 2013/0115323 A1 May 9, 2013

(30) Foreign Application Priority Data
Jul. 20, 2010 (JP) .................................. 2010-163119

(51) Int. Cl.
*B29C 33/16* (2006.01)
*B29C 45/14* (2006.01)

(52) U.S. Cl.
CPC ........... *B29C 33/16* (2013.01); *B29C 45/14065* (2013.01); *B29C 45/14377* (2013.01)

(58) Field of Classification Search
CPC .............. B29C 33/16; B29C 45/14065; B29C 45/14377; B29C 45/14; B29C 45/1671; B29C 2045/14122; B29C 2045/14131; B29C 45/14336; B29C 2045/14163; B29C 2045/14139; B29C 2045/14155; B29C 2043/568
USPC ....... 425/3, 500, DIG. 33; 264/275, 279, 259, 264/427
See application file for complete search history.

(56) References Cited

U.S. PATENT DOCUMENTS

| 2010/0104803 | A1* | 4/2010 | Nakagawa et al. | ........... 428/138 |
| 2010/0270701 | A1* | 10/2010 | Maatta et al. | ................. 264/257 |
| 2011/0042848 | A1* | 2/2011 | Ash et al. | ....................... 264/265 |

FOREIGN PATENT DOCUMENTS

| JP | 52-100068 | 7/1977 |
| JP | 60-67911 U | 5/1985 |

(Continued)

OTHER PUBLICATIONS

JP 60-067911 U (Translated). Translation courtesy of USPTO Scientific & Technical Information Center.*
JP 2008-94061 A (Mahcine Translation). Translation courtesy of Advanced Industrial Property Network.*
JP 2006-346995 A (Machine Translation). Translation courtesy of Advanced Industrial Property Network.*
Exhibit A. Annotated version of Figure 5 of US 20100104803 A1.*
JP 2009137187A (Machine Translation).*
Corresponding International Search Report with English Translation dated Aug. 16, 2011 (five (5) pages).
Japanese-language Written Opinion dated Aug. 16, 2011 (PCT/ISA/237) (four (4) pages).
European Office Action dated Mar. 3, 2014 (five (5) pages).
Extended European Search Report dated Dec. 2, 2013 (Four (4) pages).

*Primary Examiner* — James Sanders
*Assistant Examiner* — Leith S Shafi
(74) *Attorney, Agent, or Firm* — Crowell & Moring LLP

(57) ABSTRACT

A die for forming a molding includes a molding die including an upper die and a lower die cooperating with the upper die to support a glass plate and forming a resin molding, the lower die having a concave surface including a contact surface that comes into contact with a metal molding, and a plurality of aperture portions formed on the contact surface, a non-magnetic cylindrical intermediate member contacted with an inner surface of each of the aperture portions, a molding-fixing member including a crown portion that retains the metal molding, and a flange portion disposed on a lower side of the crown portion, and a magnetic force generation device. The flange portion of the molding-fixing member has an outer diameter larger than an inner diameter of each of the aperture portions.

10 Claims, 2 Drawing Sheets

(56) References Cited

FOREIGN PATENT DOCUMENTS

| | | |
|---|---|---|
| JP | 3-19817 A | 1/1991 |
| JP | 2000-15650 A | 1/2000 |
| JP | 2004-262221 A | 9/2004 |
| JP | 2006-272657 A | 10/2006 |
| JP | 2006-346995 A | 12/2006 |
| JP | 2007-44921 A | 2/2007 |
| JP | 2008-94061 A | 4/2008 |
| JP | 2009-137187 A | 6/2009 |
| JP | 2009137187 A * | 6/2009 |

* cited by examiner

DIE FOR FORMING MOLDING AND METHOD FOR PRODUCING DECORATIVE MOLDING-FURNISHED GLASS USING THE DIE

TECHNICAL FIELD

The present invention relates to a die for forming a molding which is useable to produce a decorative molding integrally formed with a glass plate, and specifically, relates to a die for forming a molding which is useable to produce a decorative metal molding integrally formed with a glass plate.

BACKGROUND OF THE INVENTION

In recent years, in a case where a glass plate is mounted to an automobile window frame made of metal, a molding-furnished glass has come into general use instead of a method of mounting the glass plate to the window frame through an elastic molding material on a peripheral edge of the glass plate. The molding-furnished glass is provided by forming a resin molding integrally with a window glass along a peripheral edge portion of the window glass in a production process in a production plant.

Further, there is known a decorative molding-furnished glass in which a metal molding having a glossy surface is provided on a portion of a surface of the resin molding to thereby enhance luxury impression and design property thereof (Patent Literature 1).

Such a decorative molding-furnished glass is formed by the following method. The metal molding is placed in a predetermined position in a chamber of a die in which a peripheral edge portion of a glass plate is located in a sandwiched state in an up-and-down direction, and after that, a softened resin is injected into the chamber to thereby form a resin molding integrally with the metal molding in the peripheral edge portion of the glass plate.

However, the metal molding placed in the die is not fixed to the die, and therefore, the metal molding tends to be displaced from the predetermined, position in the process of resin injection. Accordingly, there is a problem that a window glass provided with a decorative molding having a desired shape cannot be obtained.

In order to solve the above-described problem, there has been disclosed a die for forming a molding in which an attracting retention device is embedded. The attracting retention device is adapted to attract a metal molding in a predetermined position using a magnetic force generation device such as a magnet, an electromagnet, etc., thereby preventing occurrence of displacement of the metal molding in the die (Patent Literature 2).

CITATION LIST

Patent Literature

Patent Literature 1: Japanese Patent Application Unexamined Publication No. 2009-137187
Patent Literature 2: Japanese Patent Application Unexamined Publication No. 2007-044921

SUMMARY OF THE INVENTION

Technical Problem

The method of fixing the metal molding to the die by using the magnetic force generation device as described in Patent Literature 2 is very useful. However, there is a problem as follows. The magnetic force generation device suffers from thermal expansion due to heat generated upon energizing the magnetic force generation device and heat transferred from the softened resin, whereby there occurs a gap between a peripheral portion of the fixing portion of the die to which the metal molding is fixed by the magnetic force in the die, and a surface of a contact portion of the die which is contacted with the metal molding. As a result, a distortion and a seam are caused in a contact portion of the metal molding which comes into contact with the die.

In addition, there is a problem that an adjustment time for each die is prolonged in order to suppress occurrence of the distortion and the seam in the metal molding.

Solution to Problem

The present invention was made in view of the above-described problems encountered in the conventional art. An object of the present invention is to provide a die for forming a molding which is useable to form a decorative molding-furnished glass as an integral body having a good appearance without causing a distortion and a seam in a metal molding and displacement of the metal molding, and provide a method of producing a decorative molding-furnished glass using the die.

That is, in one aspect of the present invention, there is provided a die for forming a molding which serves to form a resin molding integrally adhered to a peripheral edge portion of a glass plate and at the same time, adhere a metal molding to the resin molding, the die for forming a molding including:

a molding die comprising an upper die forming an upper surface of the resin molding that is formed on the peripheral edge portion of the glass plate, and a lower die cooperating with the upper die to support the glass plate, the lower die forming a lower surface of the resin molding, the lower die having a concave surface including a contact surface that comes into contact with the metal molding, and a plurality of aperture portions formed on the contact surface, a non-magnetic cylindrical intervening member contacted with an inner surface of each of the aperture portions;

a molding-fixing member disposed inside of the intervening member, the molding-fixing member including a crown portion that retains the metal molding by a magnetic force, and a flange portion disposed on a lower side of the crown portion, and a magnetic force generation device that applies the magnetic force to the molding-fixing member, wherein the flange portion of the molding-fixing member has an outer diameter larger than an inner diameter of each of the aperture portions such that an upper end of the crown portion of the molding-fixing member is prevented from projecting beyond the concave surface of the lower die due to thermal expansion of the magnetic force generation device.

In a further aspect of the present invention, there is provided the die for forming a molding, further including a spacer disposed on a lower end of the intervening member, the spacer being contacted with a lower surface of the lower die in the vicinity of each of the aperture portions and having a diameter larger than the inner diameter of each of the aperture portions, wherein the crown portion of the molding-fixing member is disposed inside of the intervening member, wherein the flange portion of the molding-fixing member is disposed on a lower surface of the spacer, wherein the magnetic force generation device is disposed on a lower surface of the flange portion of the molding-fixing member, and wherein the flange portion of the molding-fixing member and the magnetic force generation device disposed on the lower surface of the flange portion are connected and fixed to each other through a bolt such that the upper end of the crown portion of the molding-fixing member is prevented from projecting beyond the concave surface of the lower die.

In a further aspect of the present invention, there is provided the die for forming a molding, further including a non-magnetic lower holder disposed between the magnetic force generation device and the lower die.

In a further aspect of the present invention, there is provided the die for forming a molding, wherein an air gap is provided between the magnetic force generation device, the lower holder, and a bracket that supports the lower holder, the air gap serving to absorb thermal expansion of the magnetic force generation device.

In a further aspect of the present invention, there is provided the die for forming a molding, wherein an inner surface of the cylindrical intervening member contacted with the inner surface of each of the aperture portions includes a small-diameter portion on a side of the contact surface contacted with the metal molding, and a large-diameter portion on a lower side thereof, the inner surface of the cylindrical intervening member having a tapered shape tapered from the lower side toward the side of the contact surface, and wherein an outer surface of the crown portion of the molding-fixing member is conformed to the tapered shape of the inner surface of the cylindrical intervening member.

In a still further aspect of the present invention, there is provided a method of producing a decorative molding-furnished glass with the die for forming a molding according to the present invention.

Effects of Invention

According to the present invention, a decorative molding-furnished glass having a good appearance can be obtained without causing a distortion and a seam on the resin molding formed on a peripheral edge portion of the glass plate by injection molding and a surface of the metal molding fixed to one surface of the resin molding, and without causing displacement of the metal molding from a fixing position relative to the die. Further, the above-described adjustment process can be shortened using the die for forming a molding according to the present invention.

BRIEF DESCRIPTION OF DRAWINGS

DETAILED DESCRIPTION OF THE INVENTION (1) Construction of Die for Forming Molding FIG. 1, FIG. 2, and FIG. 4 show a die for forming a molding according to a first embodiment of the present invention.

Figure 1:
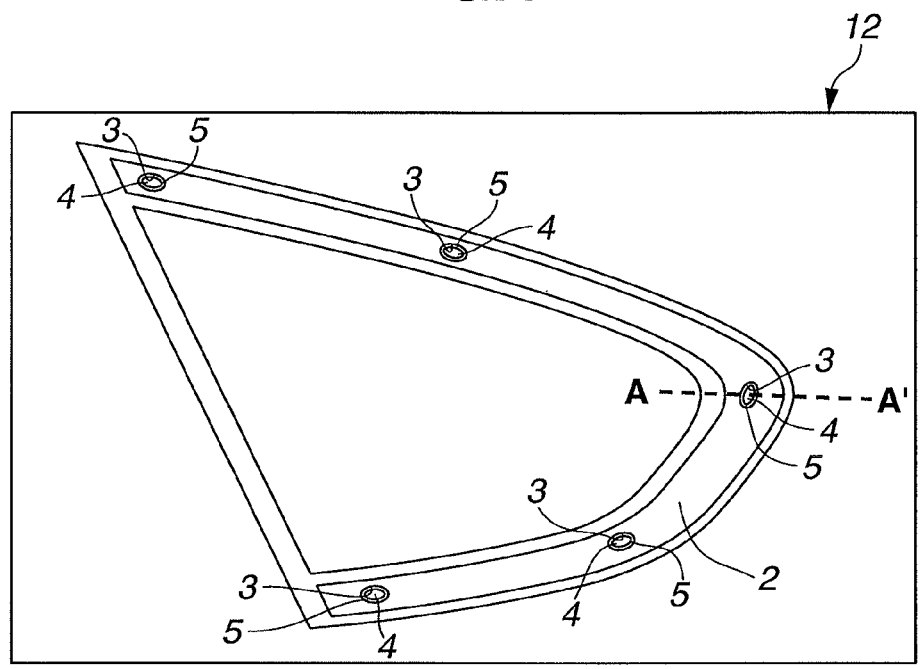
FIG. 1 is a schematic plan view of a lower die of a die for forming a molding according to a first embodiment of the present invention.
Figure 2:
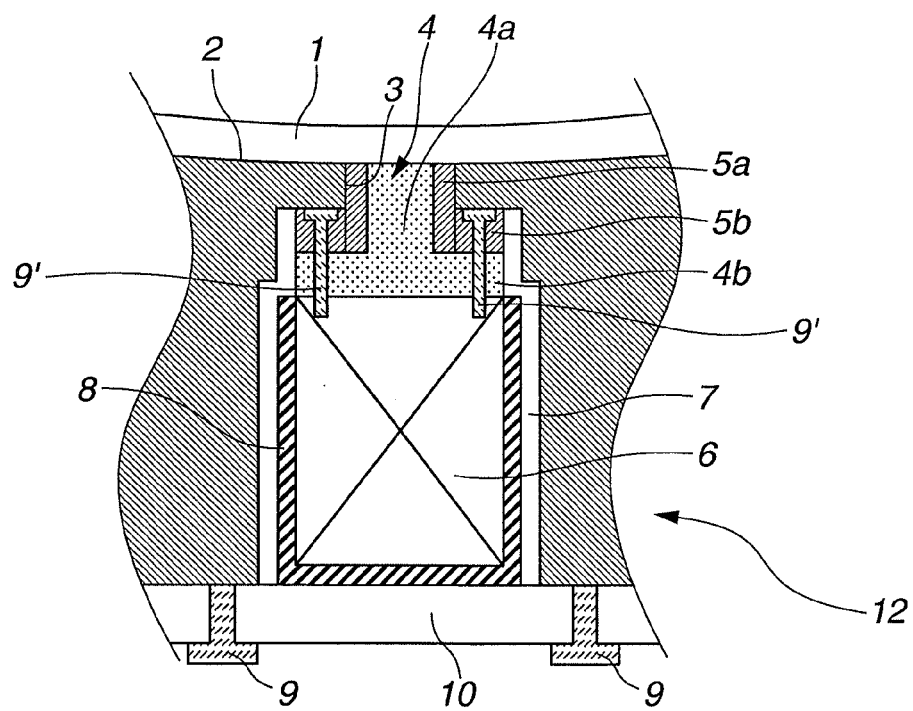
FIG. 2 is a schematic sectional view taken along line A-A' as shown in FIG. 1, and shows an essential part of the die for forming a molding according to the first embodiment of the present invention.

The die for forming a molding includes a molding die that includes an upper die 11 and a lower die 12. The upper die 11 forms an upper surface of a molding that is formed on a peripheral edge portion of a glass plate. The lower die 12 cooperates with the upper die 11 to support the glass plate, and forms a lower surface of the molding. The lower die 12 has a concave surface 2 including a contact surface that comes into contact with a metal molding 1, and a plurality of aperture portions 3, 3, . . . formed on the contact surface. The die for forming a molding also includes non-magnetic cylindrical intervening members 5a, 5a, . . . , a molding-fixing member 4 disposed inside of each of the intervening members 5a, 5a, . . . , and a magnetic force generation device 6 that applies a magnetic force to the molding-fixing member 4. Each of the intervening members 5a, 5a, . . . is contacted with an inner surface of each of the aperture portions 3, 3, . . . . The molding-fixing member 4 includes a crown portion 4a that retains the metal molding 1 by the magnetic force, and a flange portion 4b disposed on a lower side of the crown portion 4a.

The metal molding 1 is made of magnetic metal, and preferably, is made of rust-proof metal or alloy such as stainless steel or the like in view of good appearance thereof.

The upper die 11 and the lower die 12 are made of a SS steel material (JIS G3101: rolled steels for general structure) having rigidity as steel. The steel material for the upper die 11 and the lower die 12 is preferably a heat resisting steel that is not deformed by a high-temperature softened resin upon forming a resin molding by injecting the softened resin into a cavity formed by overlapping the upper die 11 and the lower die 12 with each other.

Further, each of the aperture portions 3, 3 . . . formed on the concave surface 2 of the lower die 12 onto which the metal molding 1 is attached may be in the form of a through hole that penetrates the lower die 12 or a hole that does not penetrate the lower die 12. A resin that forms the resin molding may be formed of a thermoplastic elastomer such as a styrene-based elastomer, an olefin-based elastomer, a vinyl chloride-based elastomer, etc.

The intervening member 5a cooperates with a spacer 5b as explained later to constitute an upper holder 5 that holds the molding-fixing member 4. The intervening member 5a is a cylindrical member made of a non-magnetic material, and disposed between the lower die 12 and the small-diameter crown portion 4a of the molding-fixing member 4.

With the provision of the intervening member 5a, it is possible to prevent the magnetic force applied to the molding-fixing member 4 from being dispersed to the lower die 12 to thereby cause reduction of the magnetic force at the crown portion 4a that serves to fix the metal molding 1.

The spacer 5b is made of a non-magnetic material, and is disposed between the lower die 12 and the large-diameter flange portion 4b of the molding-fixing member 4. The spacer 5b serves to suppress reduction of the magnetic force at the molding-fixing member 4 which is caused due to dispersion of the magnetic force from the molding-fixing member 4 to the lower die 12. In addition, the spacer 5b is disposed between each of the aperture portions 3, 3 . . . of the lower die 12 and the large-diameter flange portion 4b of the molding-fixing member 4. The spacer 5b is used as a space retention member that prevents the molding-fixing member 4 as a whole from being pushed up and raised toward the side of the aperture portions 3, 3 . . . due to thermal expansion of the magnetic force generation device 6.

The intervening member 5a and the spacer 5b of the upper holder 5 may be individual parts formed separately from each other or an integral part formed integrally with each other.

The molding-fixing member 4 is made of a magnetic material. The molding-fixing member 4 includes the small-diameter crown portion 4a having a diameter smaller than an inner diameter of each of the aperture portions 3, 3 . . . , and the large-diameter flange portion 4b that is disposed on the lower side of the crown portion 4a and has a diameter larger than the inner diameter of each of the aperture portions 3, 3 . . . . The crown portion 4a of the molding-fixing member 4 is disposed on an upper side of the molding-fixing member 4, and serves to fix the metal molding 1 by the magnetic force. The crown portion 4a of the molding-fixing member 4 must be arranged such that when the magnetic force generation device 6 is expanded due to heat generated therein, an upper end of the crown portion 4a of the molding-fixing member 4 can be prevented from projecting upwardly beyond the contact surface of the concave surface 2 which is contacted with the metal molding 1. Further, the upper end of the crown portion 4a has a diameter smaller than the inner diameter of each of the aperture portions 3, 3 . . . .

The molding-fixing member 4 of the first embodiment has the flange portion 4b on the lower side thereof. The flange portion 4b is a large-diameter portion of the molding-fixing member 4 which has the diameter larger than the inner diameter of each of the aperture portions 3, 3 . . . . The spacer 5b is disposed on the flange portion 4b such that the spacer 5b is located between the flange portion 4b and the lower die 12. The spacer 5b serves to retain the space between the molding-fixing member 4 and the aperture portions 3, 3 . . . and prevent the molding-fixing member 4 from being raised toward the side of the aperture portions 3, 3 . . . .

A magnetic force generation section includes the magnetic force generation device 6 and a non-magnetic lower holder 8 that encloses the magnetic force generation device 6. An electromagnet, a permanent magnet, etc., can be used as the magnetic force generation device 6.

The lower holder 8 is a non-magnetic cylindrical container that accommodates the magnetic force generation device 6. The lower holder 8 is opened on an upper side thereof, and is contacted at the upper side with the molding-fixing member 4. Further, the lower holder 8 is placed on a bracket 10 on a lower side thereof which is fixed to a bottom surface of the lower die 12 by means of bolts 9, 9 . . . .

The lower holder 8 is made of a non-magnetic material. The non-magnetic lower holder 8 serves to prevent the magnetic force generated by the magnetic force generation device 6 from being dispersed toward a peripheral side and a lower side of the magnetic force generation device 6. Therefore, it is possible to avoid reduction of the magnetic force applied to the side of the molding-fixing member 4 disposed on the upper side of the magnetic force generation device 6.

It is preferred to provide an air gap 7 between a side surface (an outer peripheral surface) of the lower holder 8 and the lower die 12. The reason therefor is that when the magnetic force generation device 6 is expanded due to the heat generated therein and the like, an increment of volume of the magnetic force generation device 6 which is caused due to the thermal expansion is absorbed by the air gap 7. In addition, with the provision of the air gap 7, the lower holder 8 can be prevented from pressing the lower die 12 to thereby suppress damage that is caused to the magnetic force generation device 6 and the lower die 12.

The magnetic force generation device 6 is arranged such that an upper surface thereof is contacted with a lower surface of the molding-fixing member 4, so that the magnetic force generated from the magnetic force generation device 6 can be applied to the molding-fixing member 4.

It is preferred that the large-diameter portion (spacer) 5b of the upper holder 5 and the flange portion 4b of the molding-fixing member 4 are fixed to the upper surface of the magnetic force generation device 6 by means of non-magnetic bolts 9', 9' . . . .

The molding-fixing member 4 and the magnetic force generation section are provided in five portions of the lower die 12 as shown in FIG. 1. However, the number of the molding-fixing members 4 and the number of the magnetic force generation sections are not limited to those illustrated in this embodiment.

The crown portion 4a of the molding-fixing member 4 may be located in a position lower than the concave surface 2 as long as the metal molding 1 is fixed by the magnetic force.

Figure 3:
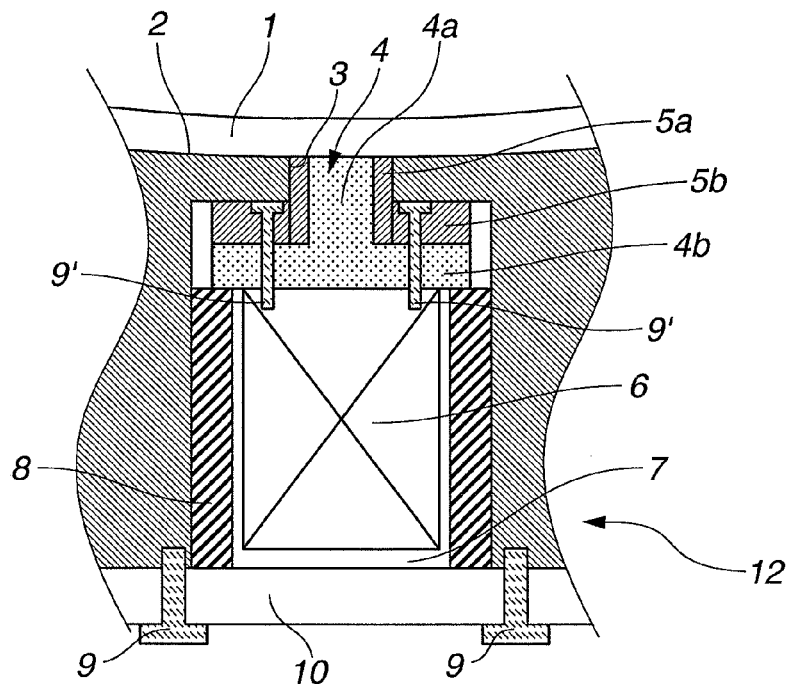
FIG. 3 is a schematic sectional view taken along line A-A' as shown in FIG. 1, but shows an essential part of the die for forming a molding according to a second embodiment of the present invention.

Next, referring to FIG. 3, there is shown a die for forming a molding according to a second embodiment of the present invention. The die for forming a molding according to the second embodiment differs from that according to the first embodiment in construction of support of the magnetic force generation device 6 and arrangement of the air gap 7 between the magnetic force generation device 6 and the lower holder 8.

The flange portion 4b of the molding-fixing member 4 disposed on the upper side of the lower holder 8, and the spacer 5b of the upper holder 5 which is disposed on the flange portion 4b are overlapped with each other and connected to each other through the non-magnetic bolts 9', 9' . . . . Thus, the magnetic force generation device 6 is fixed to the upper holder 5 in a suspended state. The air gap 7 is provided between the lower holder 8 and the magnetic force generation device 6 along a peripheral side surface and a bottom surface of the magnetic force generation device 6.

With the provision of the air gap 7, thermal expansion of the magnetic force generation device 6 can be absorbed to thereby prevent occurrence of distortion and a seam due to the thermal expansion that causes the molding-fixing device 4 to be pressed against the metal molding 1. Further, the magnetic force generation device 6 can be restrained from pressing the lower die 12 due to the thermal expansion. As a result, it is possible to prevent the lower die 12 and the magnetic force generation device 6 from being damaged.

In the second embodiment, the lower holder 8 surrounds the magnetic force generation device 6. The lower holder 8 may be formed such that a bottom portion thereof is formed integrally with the bracket 10 provided in the first embodiment.

In the following, a die for forming a molding according to a third embodiment of the present invention is described. The die for forming a molding according to the third embodiment differs from that according to the first embodiment in that an inner surface of the intervening member 5a of the upper holder 5 includes a small-diameter portion on an upper side thereof, that is, on a side of the contact surface contacted with the metal molding 1, and a large-diameter portion on a lower side thereof, and the inner surface of the intervening member 5a has a tapered shape tapered from the lower side toward the upper side, that is, the side of the contact surface, and that an outer surface of the crown portion 4a of the molding-fixing member 4 is conformed to the tapered shape of the inner surface of the intervening member 5a.

Owing to formation of the tapered shape of both the inner surface of the intervening member 5a and the outer surface of the crown portion 4a, even if the spacer 5b in the first embodiment is not provided, the crown portion 4a can be prevented from projecting toward the contact surface of the concave surface 2 of the lower die 12 which is contacted with the metal molding 1.

(2) Method of Producing Decorative Molding-Furnished Glass

Figure 4:
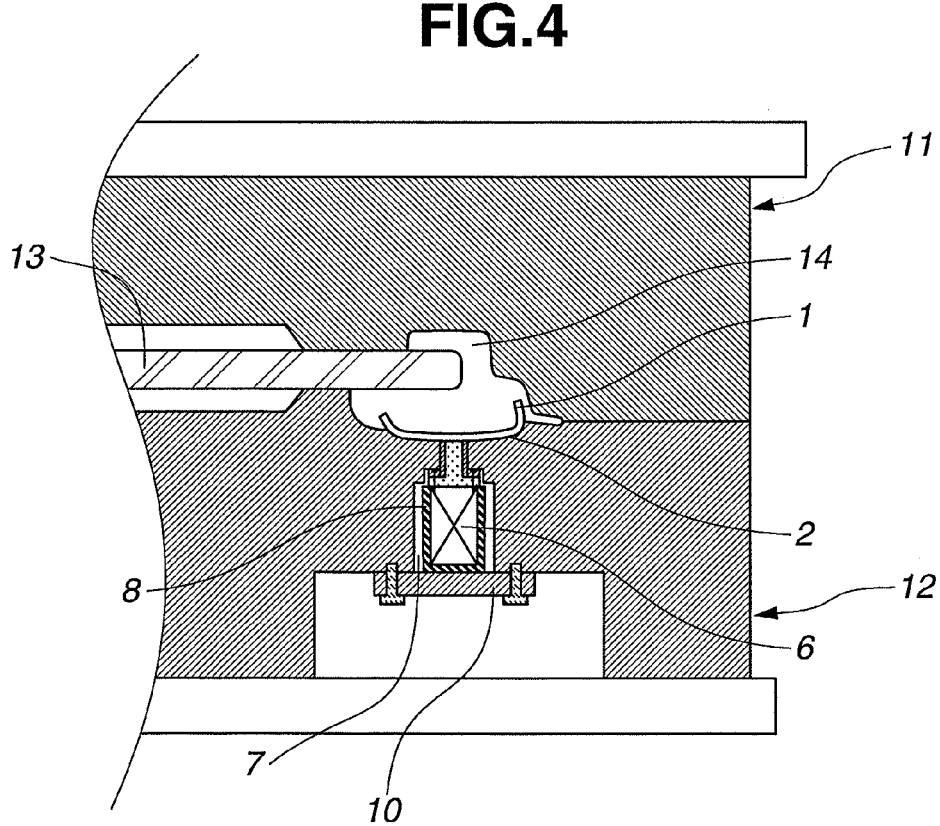
FIG. 4 is a schematic sectional view taken along line A-A' as shown in FIG. 1, but shows a method of producing a decorative molding-furnished glass using the die for forming a molding according to the first embodiment of the present invention.

First, as shown in FIG. 4, the lower die 12 of the die for forming a molding according to the present invention is placed in a given position within a molding apparatus. Then, the metal molding 1 made of SUS or the like is placed in a predetermined position on the concave surface 2 of the lower die 12. In order to fix the metal molding 1 in the predetermined position by magnetic force, the magnetic force generation device 6 is actuated to generate the magnetic force to thereby fix the metal molding 1 in the predetermined position by the magnetic force.

Next, a glass plate 13 is set in a predetermined position in the lower die 12. At this time, it is preferred that a primer (not shown) is previously applied to a peripheral edge portion of the glass plate 13 in which a resin molding is to be formed, so as to obtain stiff adhesion between a surface of the peripheral edge portion of the glass plate 13 and the resin. In addition, it is preferred that the lower die is provided with a non-slip member (not shown) such as a urethane sheet or the like which is bonded to the lower die 12, or a suction device (not shown) which sucks the glass plate 13 to the lower die 12 with a suction pad or the like, in order to prevent the glass plate 13 from being displaced from the predetermined position in the lower die 12 upon integrally forming the resin molding.

After the metal molding 1 and the glass plate 13 are fixedly disposed in the lower die 12, the upper die 11 is placed to overlap with the lower die 12. At this time, the upper die 11 cooperates with the lower die 12 to sandwich the glass plate 13 therebetween. The upper die 11 and the lower die 12 are thus overlapped with each other to thereby form a cavity 14 between the upper die 11 and the lower die 12 into which a softened resin is introduced.

Next, the softened resin is injected into the cavity 14 through an inlet (not shown) of the molding apparatus, thereby injection-molding the metal molding 1 and the resin molding integrally with each other on the peripheral edge portion of the glass plate 13.

After the softened resin injection-molded is solidified, generation of the magnetic force acting to fix the metal molding 1 is terminated, and the glass plate 13 is taken out from the upper die 11 and the lower die 12. Subsequently, a surplus of the resin formed on the peripheral edge portion of the glass plate 13 is cut and removed, so that a decorative molding-furnished glass can be obtained.

Examples of the glass plate 13 include a flat glass plate, a glass plate subjected to bending, a tempered glass, a tempered glass subjected to bending, a laminated glass produced from flat glass plates or glass plates subjected to bending, and the like.

The above-described primer serves to promote adhesion between the resin used to form a frame and the glass plate 13 or between the resin and the metal molding 1. With the primer thus applied, the frame and the glass plate 13, or the frame and the metal molding 1 can be stiffly bonded to each other. Further, since adhesion between the resin and the glass plate 13 is not sufficient in a portion of the glass plate 13 to which no primer is applied, the resin can be readily removed from the portion of the glass plate 13. Therefore, it is possible to readily cut and remove a surplus of the resin which is generated in the process of forming an integral body of the metal molding 1 and the resin molding. The process of applying the primer can be suitably selectively conducted in view of operating efficiency.

In addition, a die temperature upon injection molding, a temperature of a softened resin to be injected, an injection pressure of the softened resin, etc. can be suitably selected as necessary.

The invention claimed is:

1. A method for producing a decorative molding-furnished glass, comprising the steps of:
    (a) providing a die comprising:
        a molding die comprising an upper die forming an upper surface of a resin molding that is formed on a peripheral edge portion of a glass plate, and a lower die forming a lower surface of the resin molding, the lower die having a concave surface including a contact surface that comes into contact with a metal molding, and a plurality of aperture portions formed on the contact surface,
        a non-magnetic cylindrical intervening member contacted with an inner surface of each of the aperture portions;
        a spacer disposed at a lower end of the intervening member and in contact with a lower surface of the lower die in the vicinity of each of the aperture portions, the spacer having a diameter larger than the inner diameter of each of the aperture portions;
        a molding-fixing member comprising a crown portion that is disposed inside of the intervening member and retains the metal molding by a magnetic force, and a flange portion disposed on a lower side of the crown portion, and
        a magnetic force generation device that applies the magnetic force to the molding-fixing member,
        wherein the flange portion of the molding-fixing member has an outer diameter larger than an inner diameter of each of the aperture portions such that an upper end of the crown portion of the molding-fixing member is prevented from projecting beyond the concave surface of the lower die when thermal expansion of the magnetic force generation device occurs;
    (b) placing the metal molding in a predetermined position on the concave surface of the lower die;
    (c) setting the glass plate at a predetermined position of the lower die;
    (d) placing the upper die onto the lower die to sandwich the glass plate therebetween so that there is provided a cavity that is between the upper die and the lower die and that receives the peripheral edge portion of the glass plate and the metal molding;
    (e) fixing the metal molding in the predetermined position by the magnetic force of the magnetic force generation device; and
    (f) injecting a softened resin into the cavity of the die.

2. A method for producing a decorative molding-furnished glass, comprising the steps of:
    (a) providing a die comprising:
        a molding die comprising an upper die forming an upper surface of a resin molding that is formed on a peripheral edge portion of a glass plate, and a lower die forming a lower surface of the resin molding, the lower die having a concave surface including a contact surface that comes into contact with a metal molding, and a plurality of aperture portions formed on the contact surface, a non-magnetic cylindrical intervening member contacted with an inner surface of each of the aperture portions;

a molding-fixing member comprising a crown portion that is disposed inside of the intervening member and retains the metal molding by a magnetic force, and a flange portion disposed on a lower side of the crown portion, and a magnetic force generation device that applies the magnetic force to the molding-fixing member, wherein the flange portion of the molding-fixing member has an outer diameter larger than an inner diameter of each of the aperture portions such that an upper end of the crown portion of the molding-fixing member is prevented from projecting beyond the concave surface of the lower die when thermal expansion of the magnetic force generation device occurs;

(b) placing the metal molding in a predetermined position on the concave surface of the lower die;

(c) setting the glass plate at a predetermined position of the lower die;

(d) placing the upper die onto the lower die to sandwich the glass plate therebetween so that there is provided a cavity that is between the upper die and the lower die and that receives the peripheral edge portion of the glass plate and the metal molding;

(e) fixing the metal molding in the predetermined position by the magnetic force of the magnetic force generation device; and (f) injecting a softened resin into the cavity of the die, wherein the die further comprises a spacer disposed at a lower end of the intervening member, the spacer being contacted with a lower surface of the lower die in the vicinity of each of the aperture portions and having a diameter larger than the inner diameter of each of the aperture portions, the flange portion of the molding-fixing member is disposed under a lower surface of the spacer, the magnetic force generation device is disposed under a lower surface of the flange portion of the molding-fixing member, and the flange portion of the molding-fixing member and the magnetic force generation device disposed under the lower surface of the flange portion are connected and fixed to each other through a bolt such that the upper end of the crown portion of the molding-fixing member is prevented from projecting beyond the concave surface of the lower die.

3. The method as claimed in claim 1, wherein the die further comprises a non-magnetic lower holder disposed between the magnetic force generation device and the lower die.

4. The method as claimed in claim 3, wherein the die further comprises a bracket fixed to a bottom surface of the lower die, wherein a first air gap is provided between the magnetic force generation device and the lower holder, and wherein a second air gap is provided between the magnetic force generation device and the bracket, each of the first and second air gaps serving to absorb thermal expansion of the magnetic force generation device.

5. The method as claimed in claim 1, wherein an inner surface of the cylindrical intervening member of the die comprises a small-diameter portion on a side of the contact surface contacted with the metal molding, and a large-diameter portion on a lower side thereof, the inner surface of the cylindrical intervening member having a tapered shape tapered from the lower side toward the side of the contact surface, and wherein an outer surface of the crown portion of the molding-fixing member is conformed to the tapered shape of the inner surface of the cylindrical intervening member.

6. The method as claimed in claim 1, wherein the molding-fixing member of the die is made of a magnetic material.

7. The method as claimed in claim 2, wherein the spacer of the die is made of a non-magnetic material.

8. The method as claimed in claim 2, wherein the spacer and the flange portion of the molding-fixing member of the die are fixed to the magnetic force generation device by a non-magnetic bolt.

9. The method as claimed in claim 3, wherein an air gap of the die is provided between an outer peripheral surface of the lower holder and the lower die, the air gap serving to absorb thermal expansion of the magnetic force generation device.

10. The method as claimed in claim 1, further comprising, prior to the step (d), the step of (g) applying a primer to the peripheral edge portion of the glass plate.

\* \* \* \* \*